COMMUNICATION CIRCUIT

Original Filed Feb. 20, 1951 5 Sheets-Sheet 1

INVENTOR.
ALFRED H. FAULKNER
BY Wm. Walter Owen
ATTY.

May 31, 1960 A. H. FAULKNER 2,939,112

COMMUNICATION CIRCUIT

Original Filed Feb. 20, 1951 5 Sheets-Sheet 2

INVENTOR.
ALFRED H. FAULKNER

BY [signature]

ATTY.

May 31, 1960 A. H. FAULKNER 2,939,112

COMMUNICATION CIRCUIT

Original Filed Feb. 20, 1951 5 Sheets-Sheet 3

*INVENTOR.*
ALFRED H. FAULKNER.

BY Wm. Walter Owen.

ATTY.

COMMUNICATION CIRCUIT

Original Filed Feb. 20, 1951 5 Sheets-Sheet 4

INVENTOR.
ALFRED H. FAULKNER
BY [signature]
ATTY.

COMMUNICATION CIRCUIT

Original Filed Feb. 20, 1951 5 Sheets-Sheet 5

INVENTOR.
ALFRED H. FAULKNER
BY *Wm. Walter Owen*
ATTY.

2,939,112

COMMUNICATION CIRCUIT

Alfred H. Faulkner, Chicago, Ill., assignor to General Telephone Laboratories, Incorporated, a corporation of Delaware Original application Feb. 20, 1951, Ser. No. 211,950, now Patent No. 2,769,865, dated Nov. 6, 1956. Divided and this application May 22, 1953, Ser. No. 356,817

7 Claims. (Cl. 340—168)

The present invention is a division of my copending application, Serial No. 211,950, filed February 20, 1951, which issued as United States Patent No. 2,769,865 on November 6, 1956, relating in general to electronic telephone systems and more particularly to the establishing of connections therefor by means of electronic circuits.

As stated in the copending application, telephone systems generally are composed of mechanical switches, which are operably controlled by electrical relay circuits. The mechanical movements in the switch train are subject to a substantial time delay in completing the cascade arrangement in telephone systems. For providing connections between the mechanical switches, bank contacts are required, which are not permanent connections and which are subject to the accumulation of foreign matter thereon, thereby hindering satisfactory connections between the switches.

Electronic telephone systems have been proposed to overcome the above-mentioned problems, but, in general, these systems operate above the conventional telephone and voice frequencies, and require sustained oscillations. Therefore, such systems require radio communication type circuits, such as oscillators and phase shifters, which are intricate, costly, and difficult to maintain.

The present invention is incorporated in a telephone system wherein a gas tube matrix arranged in a plurality of rows individual to different lines and a plurality of columns individual to different selector switches is arranged to extend a call initiated from one line through a conditioned gas tube in its row to a selector switch individual to the column including the conditioned tube. Thereafter an electronic distributor is arranged to condition the gas tubes in another column individual to an idle selector switch to permit another line to extend a call to the idle switch through the conditioned tube in its row. Digital impulses are transmitted from the calling line through the fired gas tube to an electronic binary-storing circuit in the switch associated with the column. A marker common to the lines and switches is then associated with the storing circuit for translating the stored digits, and it enables the call to be completed to the called line through another gas tube matrix, which is arranged in rows individual to each line and in columns individual to each selector switch.

Accordingly, an important object of the present invention is to provide an electronic telephone system that does not require sustained oscillations or high frequency currents.

Another object of the present invention is to provide a simplified electronic telephone system that is economical to manufacture, sturdy and durable in operation, and can be maintained with facility.

Another object of the present invention is to provide an electronic telephone system having an electron tube matrix for establishing conversational paths between the calling and called parties.

Another object of the present invention is to provide an electronic distributor for pre-selecting idle selectors in succession.

Another object of the present invention is to provide selectors having electronic means therein to count and store dial pulses.

Another object of the present invention is to provide an electron tube matrix for establishing connections between the subscribers lines and selector units.

Another object of the present invention is to provide an electron tube matrix for establishing connections between several circuits through the tubes of the matrix.

Another object of the present invention is to provide circuit means for counting and storing dial pulses in binary sequence and subsequently converting the stored binary pulses into decimal equivalents.

Another object of the present invention is to provide an electron tube matrix operating entirely by direct current voltages to establish a connection between several circuits.

Other objects will appear upon further perusal of the detailed description taken in conjunction with the accompanying drawings, which show a preferred embodiment of the present invention.

Figure 1:
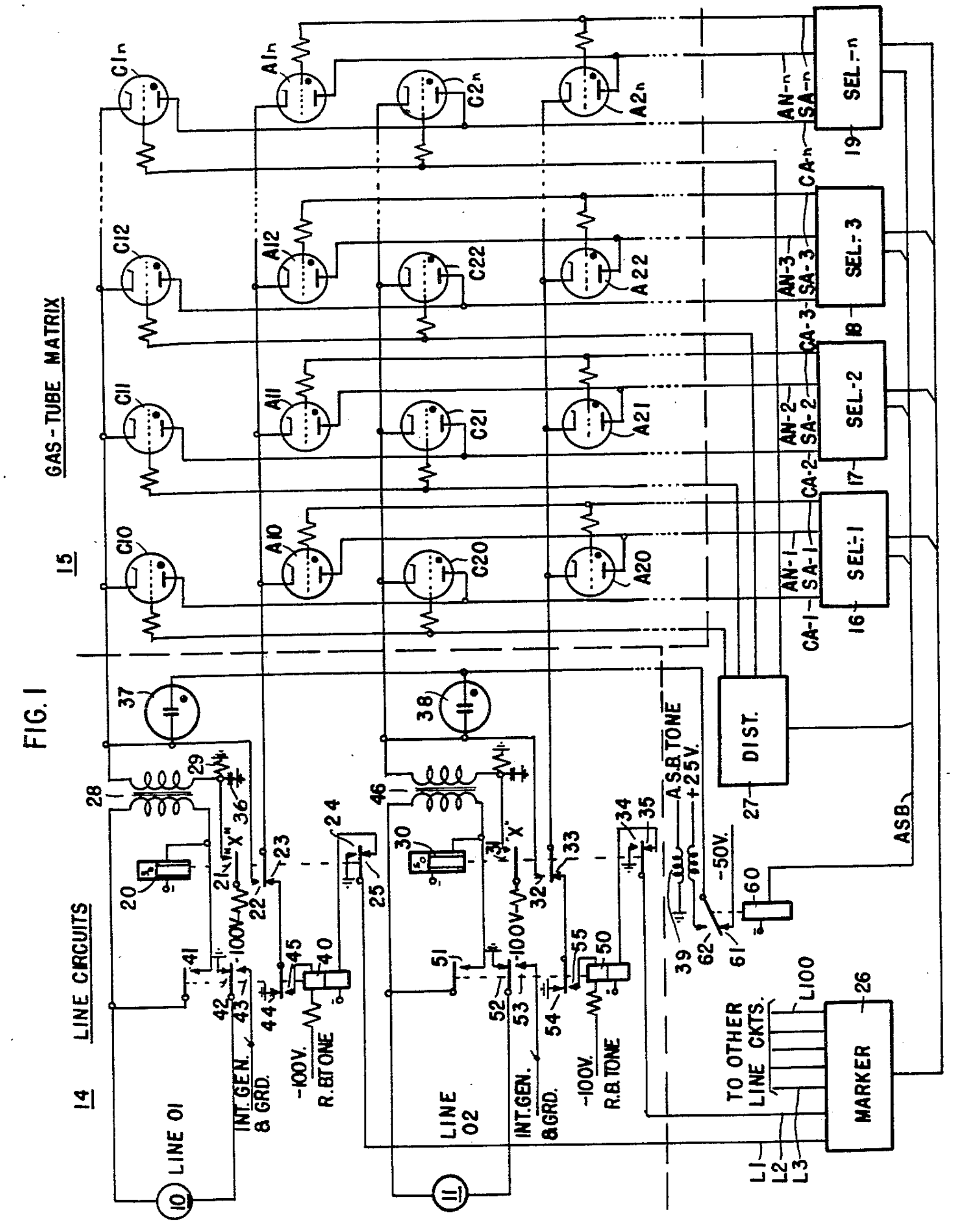
Figure 1 is a schematic diagram of an electronic telephone system embodying the present invention, and particularly illustrating a gas-tube matrix for extending connections to and from the line circuits.

Referring to Figure 1, an electronic telephone system is herein shown in its preferred embodiment, and may be adapted for use in a one-hundred line telephone exchange. The electronic telephone system comprises a plurality of substation sets, such as substation sets 10 and 11, which are conventional type substation instruments. However, for more satisfactory operation, it is preferred that the dial springs of the substation sets be shunted by a resistor to avoid undue drops in current through the line relays 20 and 30 during impulsing, as it is intended that the line relays 20 and 30 of the calling and called parties remain operated for the duration of a call.

On initiation of a call from line 01, one of the gas tubes C10, C11, C12 . . . or C1*n* is fired in accordance with which column of tubes C10 and C20, for example, associated with selector 16, for example, has been conditioned by the distributor 27. On firing the tube C10 establishes a conductive path to its associated selector switch 16. On establishing the conductive path to the selector, a signal is transmitted to the distributor 27 to cause the ring counting chain therein to be advanced for conditioning the column of tubes including C21, for example, corresponding to a succeeding idle selector switch 17, for example. Digital impulses corresponding to the called line are transmitted from line 01 through the fired gas tube C10 to an electronic binary storing arrangement in the selector switch 16. After the dial operation, the selector 16 seizes the marker 26, which is common to each selector switch in the system and to each line. The marker 26 is associated with the binary storing arrangement, and translates the stored digits into a decimal marking corresponding to the called line. It extends the marking over one of the leads such as L2 corresponding to the called line to signal the called line via relay 50, which is individual thereto. If the called line is idle, tube A20 for example, is fired under control of relay 50. Ringback tone is transmitted from the upper winding of relay 50, through the gas tube such as A20 arranged in a row associated with line 02, and in a column corresponding to the selector switch 16, through switch 16 and tube C10 to the calling party. A ringing signal is simultaneously applied to the called line under control of relay 50, while switch 16 releases marker 26 on receiving the signal resulting from the firing of tube A20. The talking connection is established on answer by the called party, through tubes A20 and C10 via the selector switch 16, while relay 50 is disconnected from the tube A20 on operation of the line relay 30 at the called line. If the marker 26 on extending a signal via lead L2 to the called line finds ground on lead L2 instead of battery through relay 50 indicating the called line is busy, it signals the selector switch 16 of the busy condition. The selector switch 16 then transmits a busy tone through tube C10 to the calling line, while it releases the marker 26.

Line circuits 14, where for the purpose of simplicity, only two lines are shown, are extended from the telephone substation sets 10 and 11 to a group of electron tubes, such as cold cathode type gas-tubes, which form a matrix 15 or a coordinate array of gas-tubes having rows and columns. Using gas-tubes of the cold cathode type conserves power, since there is no dissipation of energy in the heating elements. Further, the arrangement herein provided operates entirely on D.C. voltages. The actual direct current voltages shown and described in the drawings and the following specification are for purposes of explanation only. It is to be understood that these values are dependent upon the characteristics of the specific types of cold cathode tubes used. The present embodiment makes use of tubes having electrical characteristics similar to the type OA4G. The gas-tube matrix 15 is directly connected to a group of electronic selectors 16, 17, 18 and 19, thereby eliminating the mechanical switches for establishing connections from the calling and called lines. Matrix 15 also establishes conversational paths between the calling and called lines. It is to be noted that the connections and conversational paths are established through the gas-tubes of the matrix 15.

The gas-tube matrix 15 in the preferred embodiment comprises a group or row of calling tubes, such as C10, C11, C12 and C1N which are individually associated with the first line for extending a call, and each tube is individually associated with a particular selector. The first line, having substation 10 thereon, will be designated line 01, while the line having substation 11 thereon will be designated line 02. By way of example, C10 is associated with selector 16 and C11 is associated with selector 17. Another group or row of gas-tubes A10, A11, A12 and A1N are associated with line 01 for receiving a call, and each tube is individually associated with a particular selector. Similarly, line 02 has associated therewith a group or row of calling tubes C20, C21, C22 and C2N, and a group or row of answer tubes such as A20, A21, A22 and A2N.

Assume that the subscriber on line 01 calls the subscriber on line 02. In so doing, the loop over line 01 closes to energize the line relay 20 over the following path: ground, contacts 42, substation 10, transformer 28, relay 20 and battery. Relay 20 operates to close contacts 21, thereby placing −100 volts on the cathodes of tubes C10, C11, C12 and C1N through the resistor in the battery lead and the RC circuits 29 and 36. Contacts 22 close to prevent the answer tubes A10, A11, A12 and A1N from operating. Contacts 24 close to ground the marker 26 to indicate that line 01 is busy.

For establishing connections from the line circuits 14 to an idle selector of the group of selectors 16, 17, 18 and 19, a distributor 27 is herein provided which preselects in successive order an idle selector of the aforementioned group, as well as conditions the column of gas-tubes of matrix 15 associated with the pre-selected idle selector for operation by applying an operating potential on the starter-anodes thereof.

Figure 4:
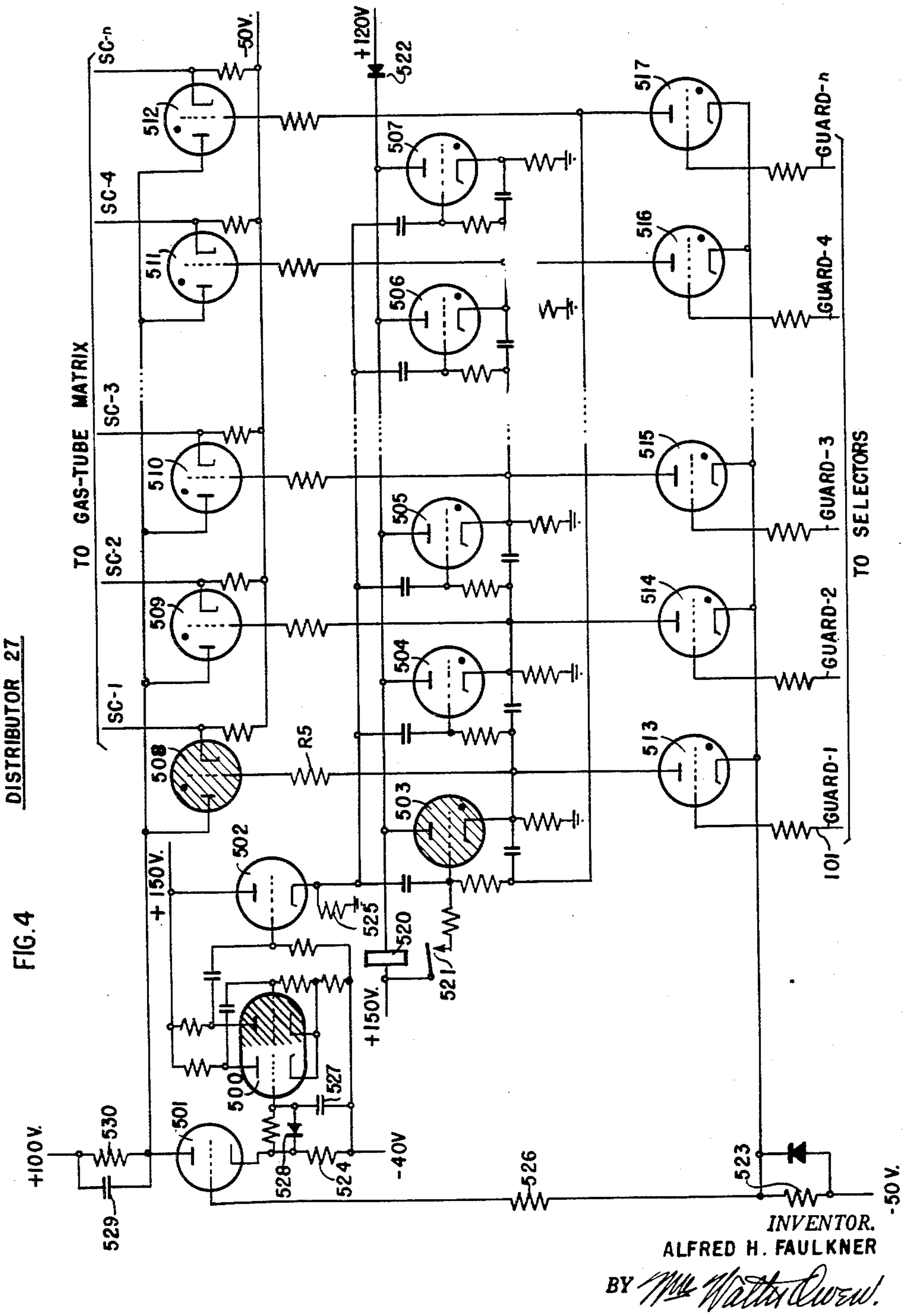
Figure 4 is a schematic diagram of an electronic distributor.

The distributor 27, shown in block diagram in Figure 1 and in detail in Figure 4, comprises a group of selector testing circuits having therein suitable tubes, such as gas-tubes 513 and 517. Each selector testing circuit has one tube therein, which is individual to a particular selector.

In order to provide a sequential operation for the distributor 27, a ring counting chain or circuit is herein provided having suitable tubes, such as gas-tubes 503–507. The ring counting circuit, operating in sequential manner, operates only one tube at a time for conditioning one of the selector testing circuits at a time. When the conditioned selector testing circuit encounters a busy selector, it operates a pulsing or control circuit having vacuum tubes 500–502. The operation of the pulsing circuit transmits a pulse to the ring counting chain causing the succeeding tube of the ring counting chain to fire, thereby preparing the succeeding selector testing circuit for operation. The selector testing circuits operate in succession until an idle selector is encountered.

Another series of gas-tubes 508–512 form an outgoing circuit, which is arranged to mark leads SC–1 to SC–N according to the condition of a ring counting chain for preparing the gas-tubes of matrix 15 associated with the pre-selected idle selector for operation.

In a ring counting circuit of the type shown some starting means is required to fire one of the tubes before counting can commence. In the present instance, relay 520 serves to start the chain. When power is applied to the distributor 27, a potential source is extended from the back contacts 521 on relay 520 to the starter-anode of tube 503, causing it to strike. The anode current of tube 503 energizes relay 520 causing it to operate. Contacts 521 break to open the starter circuit. Rectifier 522 prevents the anode potential from falling below positive 120 volts in subsequent circuit operations.

When tube 503 strikes, its cathode potential rises to a positive 50 volts, since there is a 70 volt drop across the tube. It will be noted that with tube 503 non-conductive that its cathode is at the same ground potential that is connected to the lower end of he resistor in its cathode circuit, while its plate circuit is at +120 volts. When tube 503 fires its cathode potential changes from ground potential to +50 volts, as the voltage drop across the tube is 70 volts. This 50 volt cathode potential is impressed via resistor R5 on the starter anode lead of gas-tube 508 causing it to strike and raise the potential on the SC–1 lead from −50 volts to a positive 25 volts. All other SC leads remain at a potential of −50 volts. The 50-volt potential on the cathode of tube 503 prepares the tube 513 for operation.

When selector 16, the first selector in successive order, is seized or busy, a potential on guard lead 101, indicating busy, is adequate to trigger gas-tube 513, since tube 503 is operating, causing its cathode potential to increase from −50 volts to a −30 volts. Tube 513 can only strike when tube 503 is operating, since the anode potential on tube 513 is controlled by a current flow through the cathode resistor of tube 503. A 20 volt change across resistor 523, which is in the cathode circuit of tube 513, causes tube 501 to become conductive, thereby dropping the voltage on the anode of tube 508 to approximately ground voltage. Tube 508 is thus extinguished and causes the potential on lead SC–1 to drop to −50 volts.

Conduction in the tube 501 also produces a positive pulse across resistor 524. This positive pulse is impressed on the grid of the left triode of tube 500 through an RC filter. The purpose of this filter is to delay advancement of the counting chain until the potential on the anode of tubes 508–512 has fallen below the extinction point, thereby precluding interference with busy circuits during advancement of the counting chain.

A multivibrator circuit, having the tube 500 operates in a conventional manner. When one triode of the pair conducts, it renders the other tube non-conducting. The right triode of tube 500 is rendered non-conductive by the operation of the left triode, when the positive pulse is impressed on the grid thereof causing tube 502 to operate to generate a short positive pulse across the resistor 525 of its cathode circuit. Each pulse across the resistor 525 advances the ring counting chain one step in a well known manner. The firing of one tube places the pre-firing bias on the succeeding tube by means of the voltage drop across the cathode resistor of the one tube. Therefore, when tube 503 fires, it lowers the amount of voltage needed on the starter-anode of only tube 504, so that the positive pulse fires only tube 504. When tube 504 strikes, it extinguishes tube 503 by increasing the cathode voltage on tube 503 by means of a discharge of the condenser connected from the cathode of tube 504 to the cathode of tube 503, so that the tube 503 cannot maintain ionization. As the cathode of tube 503 returns to ground potential, tube 513 is extinguished and tube 514 strikes, if the second selector is busy.

Assuming that the third selector is idle, tube 515 does not strike when tube 505 becomes ionized. Hence, when tube 514 is extinguished, the junction of resistors 523 and 526 returns to a —50 volts, thereby cutting off the plate current in tube 501. Condenser 527 is quickly discharged through rectifier 528 and resistor 524 to stop the advancement of the counting chain. Condenser 529 discharges more slowly through resistor 530, until tube 510 is able to strike. The time constant of condenser 529 and resistor 530 determines the minimum delay between the removal of the positive enabling potential on an SC lead, and the restoration of this enabling voltage on another SC lead.

Seizure of the idle selector by a line circuit is accomplished when a column of gas-tubes of the matrix 15 associated with the idle selector is prepared for operation by the distributor 27 and the pre-selected idle selector, and subsequent thereto the line circuit impresses a potential on the cathode of the gas-tubes of matrix 15 in the row associated therewith.

Therefore, the tube of matrix 15 that is capable of firing for seizure therethrough to the pre-selected idle selector is the tube in the column associated with the pre-selected idle selector and in the row associated with the operated line circuit.

Figure 2:
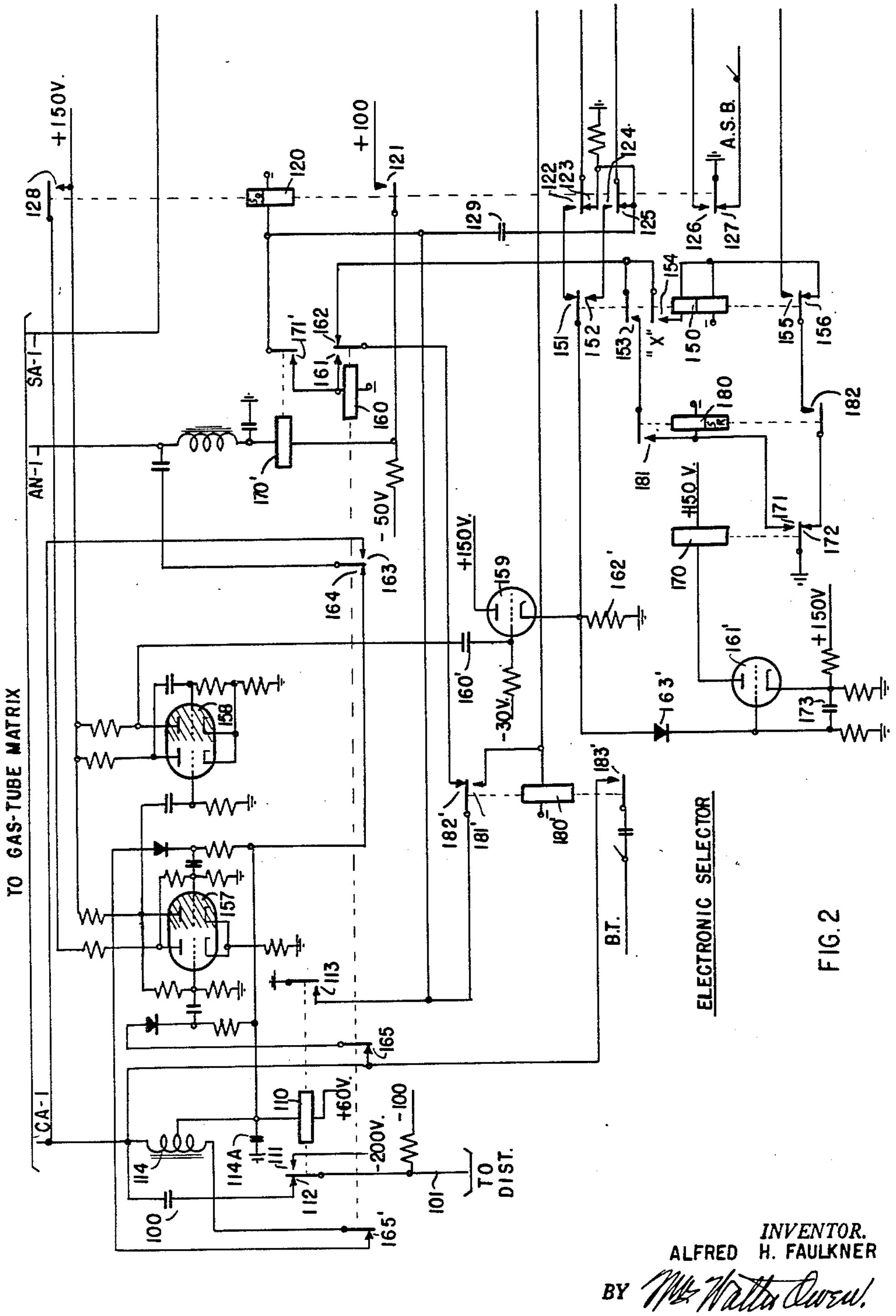
Figures 2 and 3 are schematic diagrams of the electronic selector.
Figure 3:
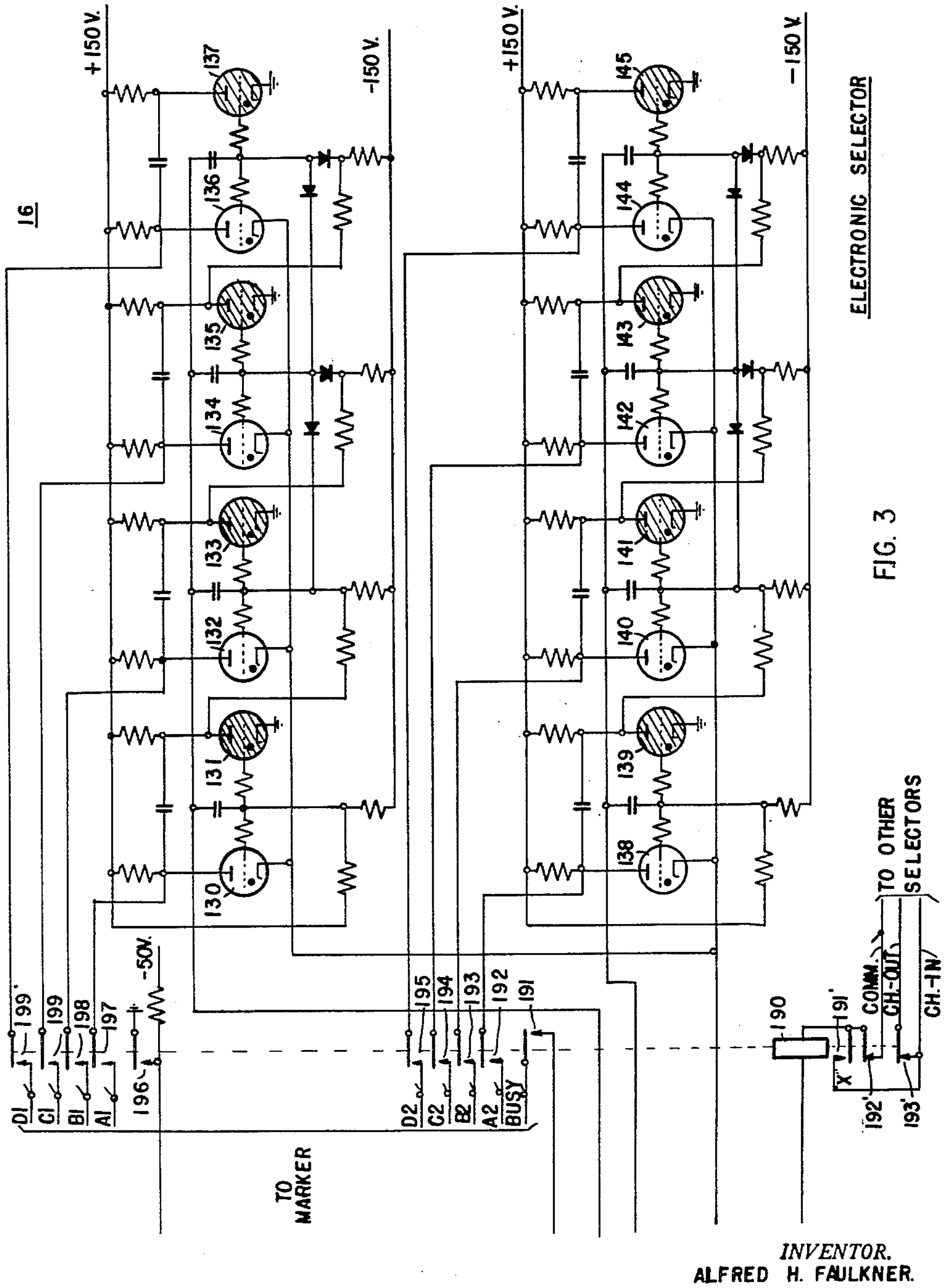

In the event that an idle selector is available, such as selector 16 which is shown in block diagram in Fig. 1 and in detail in Figs. 2 and 3, a positive 60 volt potential is impressed on the plate of the gas-tubes associated therewith, such as tube C–10 over the following path: CA–1 lead, choke coil 114, relay 110 and +60 volt battery. When relay 20 of circuit 01 operated, tube C–10 of gas-tube matrix 15 strikes, when in the transient condition its cathode potential is reduced to a —65 volts.

The transition of the discharge to the anode of tube C–10 causes the potential of lead CA1 to drop from +60 volts to +5 volts due to a 70 volt drop in the main gap of tube C–10. The sudden change in potential on lead CA–1 causes the distributor 27 to reduce the potential of lead SC–1 to from +25 volts to —50 volts, and the distributor 27 then advances to the next idle selector. After a suitable delay, the distributor 27 raises the potential on the SC lead of the next idle selector from a —50 to positive 25 volt. Before this enabling potential is applied to an SC lead, the cathode potential of tube C10 will be increased to approximately —30 volts. Hence, application of a +25 volts to an SC lead, such as SC–2, does not cause the corresponding tube C11 to strike.

Dial tone is not required in the present invention, since there is practically no delay in connecting a calling line to an idle line selector.

The operated line circuit transmits a series of dial pulses that contains an A.C. component of rectangular wave form, except as modified by line distortion. The fundamental frequency of the A.C. component is normally ten cycles per second, but with the present system the value can be raised.

The lower secondary terminal of transformer 28 is maintained at ground potential for A.C. signals by means such as a by-pass condenser 36. The center tap of coupling choke 114 in the selector 16 is maintained at a ground potential for A.C. signals by means such as a by-pass condenser 114A. The upper secondary terminal of transformer 28 and the upper terminal of choke coil 114 of selector 16 are connected to the cathode and anode of tube C10, respectively. As the voltage across the ionized gas-tube C10 varies to only a slight degree with variations in current, signals appearing across the secondary of transformer 28 are accurately transmitted to and from the selector 16.

To avoid using an unduly large line transformer for transformer 28, the impulse responding apparatus in the selector 16 is arranged to respond to the higher frequency components in the impulse wave.

When the fundamental frequency of the impulse wave is considerably below the lowest frequency, which can be transmitted through the line transformer, a short pulse of one polarity appears across the secondary winding of transformer 28 at the start of each impulse and a short pulse of the opposite polarity appears at the end of each pulse.

Referring now to Figures 2 and 3, as previously described, seizure is accomplished by establishing a circuit through the gas-tube matrix 15 to the CA lead of the chosen selector. The consequent drop is transmitted through condenser 100 to a guard lead 101 in the distributor 27. After a brief delay, relay 110 of the selector 16 is energized through the CA lead and the choke coil 114.

Relay 110 in operating closes contacts 111 to transfer the guard lead 101 to a —200 volt battery to mark the selector busy for the duration of the call. Further, contacts 113 close to energize slow-to-operate relay 120 over the following path: ground, contacts 113, relay 120, and battery. Relay 120 being a slow-to-operate relay permits the ground on contacts 113 to transmit a positive pulse through a coupling condenser to the impulse lead of the counting circuit before the transfer operation of contacts 122, 123, 124 and 125 takes place.

The counting circuit shown in Figure 3 comprises a first and second counting chain. The first counting chain comprises a plurality of flip-flop type circuits that have a binary sequential operation. Each flip-flop circuit comprises a pair of tubes such as gas-tubes 130 and 131. In the conventional manner one tube of a pair can conduct at a time. The conduction of one tube renders the other tube of a pair non-conducting.

In a similar manner the remaining pairs of gas-tubes, such as tubes 132, 133; 134, 135; 136, 137 are connected in a conventional flip-flop manner. The binary sequential operation is provided by suitable connections between the flip-flop circuits. In a similar manner the second counting chain comprises interconnected flip-flop circuits to provide a binary sequential operation. The flip-flop circuits are formed by pairs of gas-tubes such as tubes 138, 139; 140, 141; 142, 143 and 144, 145.

The cathode circuits of the left tube of each pair are open at this time, and therefore non-conducting. The right tube of each pair are assumed to be conducting. The particular tubes that will be conducting will depend upon the previous operations of the selector.

The positive pulse transmitted initially by the ground on contacts 113 to the impulsing lead causes all of the right triodes of each pair in the counting circuit to conduct, thus preparing the counting chains for operation.

When relay 120 operated, the cathode circuits of the left triodes of each pair are completed by the closing of contacts 126. Further, the impulsing leads are transferred to the contacts of relay 150 by the closing of contacts 122 and 124. To prepare for subsequent circuit operations, contacts 128 close to apply 150 volt plate voltage to the left triode of pulse repeater circuit tube 157 and contacts 121 close to apply 100 volts to the AN–1 lead through relay 170'.

The two sections of the pulse repeating circuit, tube 157, are connected in a conventional flip-flop circuit. The flip-flop circuit comprising tube 157 is coupled through rectifiers and RC circuits in such a manner that a positive pulse on lead CA–1 causes the left triode to conduct and thereby renders the right triode non-conducting, and a succeeding negative pulse causes the right triode to conduct, thereby rendering the left triode non-conductive.

As previously noted, the dial pulses transmitted over the calling line each produce a pulse of one polarity across the secondary of line transformer 28 at the start of each impulse and produce a pulse of the opposite polarity at the end of each impulse. The line transformer 28 is poled to drive lead CA–1 positive at the start, and negative at the end of each impulse. Thus a series of impulses causes the state of tube 157 to be reversed and returned to normal a number of times corresponding to the number of impulses in the series.

Each time the tube 157 changes conduction from the right triode to the left triode, a short positive pulse with an exponential decay is delivered to the left triode of pulse-shaping circuit, tube 158, through an RC circuit having a short time constant. Tube 158 is connected in a pulse-shaping circuit manner, and is arranged to deliver a short rectangular pulse to the grid of pulsing tube 159 through coupling condenser 160' for each input pulse. Pulsing tube 159 is used as a cathode follower to reproduce the rectangular pulse across a relatively low value resistor 162' in its cathode circuit. Resistor 162' is connected to the impulse leads through the contacts 151 of relay 150. Since relay 120 is operated, the first series of impulses are extended only to the first counting chain through contacts 123.

The first counting chain operates in a binary sequential manner so as to advance one count for each pulse in a binary sequence. Tubes 130 and 131 change conduction for each pulse; tubes 132 and 133 change conduction with every second pulse and tubes 134 and 135 change conduction with every fourth pulse, etc.

The positive pulses appearing across the resistor 162' in the cathode circuit of tube 159 are impressed on the grid of transfer circuit tube 161' through the rectifier 163' to render tube 161' conductive thereby energizing relay 170. A condenser 173 is provided in the grid circuit of tube 161' to maintain conduction in the tube between impulses. Following a series of impulses, the charge on condenser 173 gradually decays, causing relay 170 to restore.

Relay 170 operates and contacts 171 close to energize relay 180. Relay 180 operates and contacts 181 prepare a locking circuit for relay 180 and contacts 182 prepare an operating circuit for relay 150. After the first series of pulses, relay 170 releases and contacts 172 close to energize the lower winding of the two-step relay 150 over the following path: battery, relay 150, contacts 156, contacts 182, contacts 172 and ground. "X" contacts 154 close to energize a second operating circuit for relay 150 over the following path: battery, relay 150, contacts 154, contacts 162, contacts 182', contacts 113 and ground.

Relay 150 fully operates and transfers the pulsing resistor 162' in the cathode circuit of tube 159 from the first counting chain to the second counting chain by closing contacts 152 and breaking contacts 151. Contacts 153 prepare a locking circuit for relay 180 and contacts 155 prepare a circuit to energize relay 190. Relay 120 is still operated so that the pulsing circuit is now through contacts 124. Relay 180 releases a short time after relay 170 released.

The second counting chain is operated during the second series of pulses and operates in a manner similar to that described for the operation of the first counting chain. Therefore tubes 138, 139 change with every pulse; tubes 140, 141 change with every second pulse; and tubes 142 and 143 change with every fourth pulse in a binary sequence.

Relays 170 and 180 operate again in a manner previously described. At the completion of the second series of impulses, relay 170 restores and relay 180 locks over the following path: battery, relay 180, contacts 181, contacts 153, contacts 162, contacts 182', contacts 113 and ground.

After relay 170 restores, contacts 172 close to energize relay 190 over the following path: ground, contacts 172, 182, contacts 155, relay 190, through a contact chain of corresponding relays in other selectors, and battery through a relay 200 in the marker 26. The contact chain is a well-known one-at-a-time circuit. If none of the corresponding relays in the other selectors are operated, relay 190 operates and contacts 191 close to connect a busy lead to the marker 26. All of the leads such as A1–D1 and A2–D2 extending to the marker 26 are connected to the counting chains by the closing of contacts 192–199'. The operated tubes in the first counting chain represents the tens digit of a called party, and similarly the operated tubes in the second counting chain represent the units digit of a called party.

In the event that all electronic selectors are busy, relay 120 of selector 16 and relays similar to relay 120 in the remaining selectors will be operated, thereby opening contacts 127 and similar contacts in the remaining selectors to release normally operated all-selector busy relay 60, as shown in Figure 1. Relay 60 releases and contacts 62 close and contacts 61 open, thereby causing the potential on the commoned electrodes of the busy gas diodes, such as gas-tube diodes 37 and 38 to be switched from −50 volts to a +25 volts. Since relay 20 is operated, a transient voltage of approximately −60 volts is applied to the left electrode of tube 37 over the following path: battery, contacts 21, A.C. circuit 36, 29, transformer 28 and tube 37, thereby causing only tube 37 to strike. The striking of tube 37 connects line 01 to a common all-selector-busy tone by way of transformer 39 and the loop circuit of line 01. Therefore, the all-selector-busy signal is returned to the calling subscriber, and when the subscriber on line 01 replaces the handset, line relay 20 releases by way of the discontinuity of the line loop, thereby causing the diode 37 to extinguish, when contacts 21 break.

Figure 5:
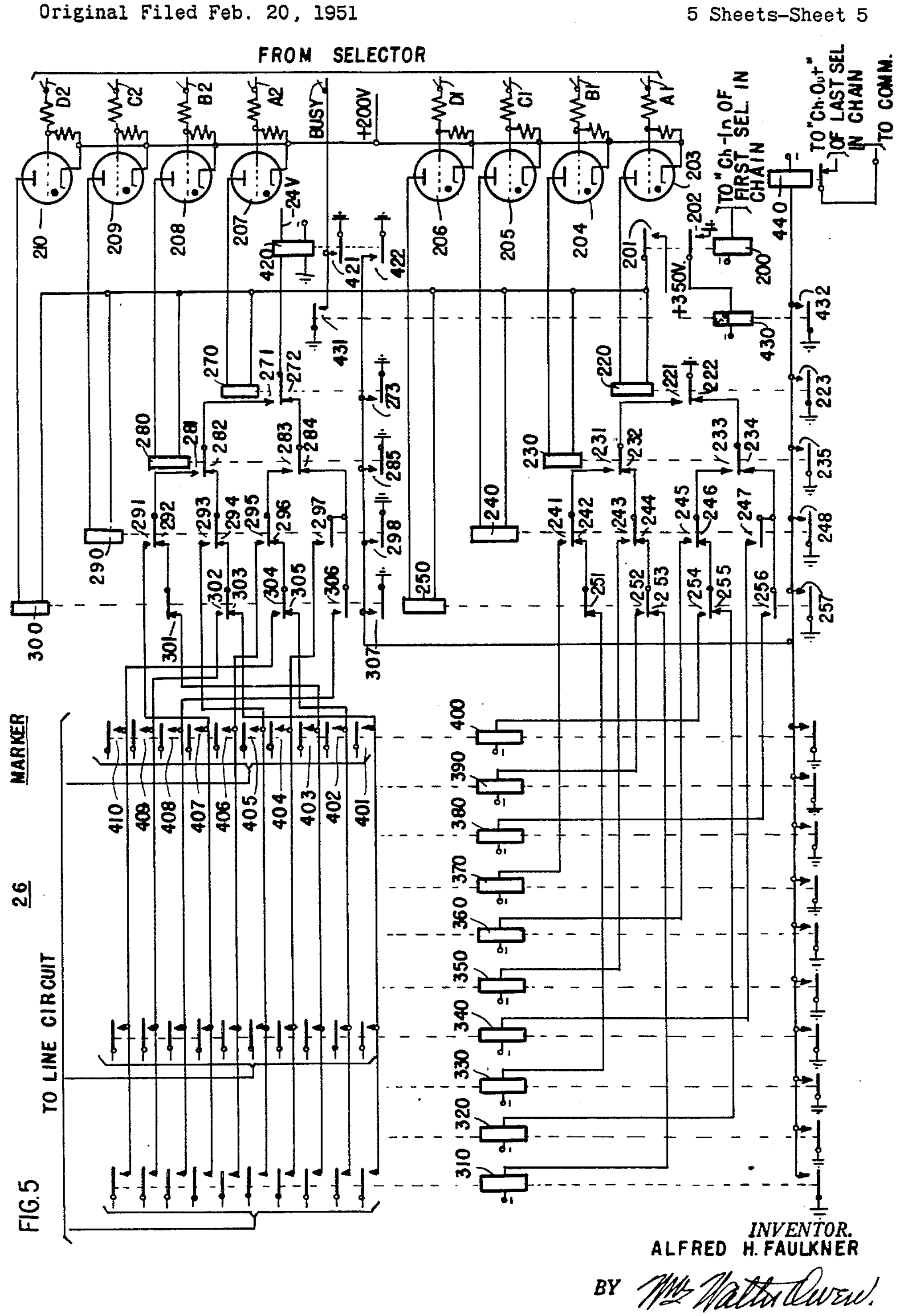
Figure 5 is a schematic diagram of a marker circuit.

Referring now to Figure 5 for the operation of the marker 26. Upon the receipt of two series of impulses, selector 16 seizes the marker 26 through corresponding leads shown in Figures 3 and 5. Relay 200 of the marker 26 is energized over the following path: battery, relay 200, CH-in lead, contacts 191', relay 190, contacts 155, contacts 182, contacts 172 and ground.

Relay 200 operates and contacts 201 close to place anode voltage on the marker gas-filled tubes 203–210 through their associated digit converting relays 220–300.

The tubes 203–210 have their starter-anodes connected to the counting chains of Figure 3, through leads A1–D1 and A2–D2. Therefore, the tubes 203–210 that are connected to the ionized tubes of the counting chains of the selector 16, shown in Figure 3, will strike, since such starter-anodes are 130 volts negative with respect to the cathodes. The starter-anodes which extend to extinguished ones of the counting tubes in selector 16 are only 50 volts negative with respect to the cathodes, which is insufficient to initiate ionization in these tubes.

Digit converting relays 270–300 are operated in accordance with the binary equivalent of the units digit in the called number as registered in the second counting chain and relays 220–250 are operated in accordance with the tens digit in the called number as registered in the first counting chain. These relays convert the binary codes into the decimal equivalents. Relays 310–400 represent the decimal equivalent of the tens digits of the called number and are operated in accordance with the operated relays of the group of relays 220–240 to select the corresponding tens group of the leads L1–L100 leading to the line circuits. Relay 310 represents the tens digit 1; relay 320 represents the tens digit 2; relay 330 represents the tens digit 3, etc.

In the present instance, the called number is 02, therefore the tubes 132 and 136 of Figure 3 are conducting, and consequently tubes 204 and 206 of Figure 5 are conducting. Relay 230 in series with tube 204 is energized over the following path: 350 v. battery, contacts 201, relay 230, tube 204, and 200 v. to battery. Relay 250 in series with tube 206 operates over the following path: 350 v. battery, contacts 201, relay 250, tube 206, and 200 v. battery. Contacts 233 close and contacts 254 close to complete an energizing circuit to "0" tens digit relay 400 over the following path: battery, relay 400, contacts 254, contacts 246, contacts 233, contacts 222 and ground. It is to be noted that there is no other completed circuit for operating any of the other tens digit relays.

For effecting the units digit, tube 140 of Figure 3 is conducting and consequently tube 208 of Figure 5 is conducting. Relay 280 in series with tube 208 operates over the following path: 350 v. battery, contacts 201, relay 280, tube 208, and 200 v. battery.

The relays 270–300 control the marking of the units digit of the called party. When relay 400 operated contacts 401–410 closed. With relay 280 operated, contacts 281–285 close and line 02 of the line circuits is marked over the following path: contacts 402, contacts 305, contacts 296, contacts 283, contacts 272, relay 420 and battery.

The upper winding of relay 420 is therefore connected to lead L2 of Figure 1, which extends to battery through relay 50 of Figure 1, if the line is idle. If line 02 is busy relay 420 is connected to ground by contacts 34 of Figure 1. The direction of current flow through the upper winding of relay 420 is determined by whether line 02 is busy or idle.

If line 02 is busy, relay 420 operates and contacts 421 close to ground the busy lead extending to selector 16. Relay 180′ of the selector in Figure 2 is energized over the following path: battery, relay 180′, contacts 191, busy lead, contacts 421 and ground.

Relay 180′ operates and contacts 181′ complete a locking circuit by way of contacts 113 to ground. Contacts 183′ close to place a busy tone to lead CA–1 to notify the calling subscriber of the busy condition. Contacts 182′ break to release relay 180 over a previously described path. Relay 180 restores and contacts 182 break to release relay 190 of the selector 16, Figure 3, and relay 200 of the marker, Figure 5, over a previously described path. The releasing of relays 190 and 200 frees the marker 26 for other calls.

In the event that line 02 has been previously placed in the ringing condition by another selector, and the call has not been answered, relay 420 of the marker will not operate and selector 16 will not be connected to line 02 because of the previously established connection. Under these conditions relay 200 being operated closes contacts 202 to energize slow-to-operate relay 430. After a brief delay relay 430 operates and contacts 431 close to operate the busy relay 180′ in a manner previously described, thereby sending busy tone to the calling party and releasing the marker 26 in a manner previously described.

When the selector releases the marker 26, relay 200 restores and contacts 201 open to remove the anode supply to tubes 203–210, thereby extinguishing any ionized tube. Relay 440 remains operated until all other relays have restored to insure complete restoration of marker 26 before seizure by another selector is permitted. It is to be noted that any operated relay places a ground connection on the operating circuit of relay 440. When relay 440 restores, it completes the one-at-a-time chain circuit, enabling the marker 26 to be seized.

In the event that line 02 is idle, relay 420 does not operate, but ringing relay 50, Figure 1, is energized in series with relay 420 over the following path: battery, relay 50, contacts 35, L2, contacts 402, contacts 305, contacts 296, contacts 283, contacts 272, upper winding of relay 420, and −24 volt battery to ground.

Ringing relay 50 operates contacts 55, thereby placing −100 v. on the cathodes of answer gas-tubes A20, A21, A22 and A2$n$ over contacts 33. Whenever a selector is connected to the marker 26, the potential on the corresponding SA lead is changed from a −50 volts to a ground potential at contacts 196, hence lead SA–1 is at ground potential and leads SA–2 to SA–$n$ are at −50 volts. The 100 volt difference in potential between the cathode and starter-anode of tube A20 causes the tube A20 to strike, thereby completing a holding circuit for relay 50 by way of contacts 33 and 55, lead AN–1 to a −50 volts. After the tube A–20 has fired, its cathode potential changes to approximately +10 volts by reason of the voltage drop across the resistance in its anode and cathode circuits.

Relay 50 in operating short circuited a line transformer 46 by way of contacts 51 and transferred the "+" terminal of line 02 from direct ground to ground through the interrupted generator by way of contacts 53. Ringing current is now transmitted to the called party over the following path: ground, ringing generator, contacts 53, and substation set 11, contacts 51, relay 30 and battery.

Relay 170′ of the selector 16, Figure 2, is energized in series with tube A20 and relay 50 over the following path: battery, relay 170′, lead AN–1, tube A20, contacts 33, contacts 55, relay 50 and −100 v. battery.

Relay 170′ operates and contacts 171′ close to energize a slave relay 160 over the following path: battery, relay 160, contacts 171′, contacts 113 and ground. Relay 160 operates and contacts 161 close to complete a holding circuit over the following path: battery, relay 160, contacts 161, contacts 182′, contacts 113 and ground. Contacts 165 and 165′ break to open the input circuits to tube 157. Contacts 163 close to connect lead AN–1 to lead CA–1 through a coupling condenser to establish a transmission circuit for the calling and called lines. Contacts 162 break to open the previously described locking circuits to relay 150 and 180 thereby releasing relays 150 and 180.

Relay 150 releases and contacts 155 break to release relay 190 over a previously described path. Relay 190 releasing frees the marker 26. The restoration of relay 190 causes the potential on lead SA–1 to return to −50 volts by opening contacts 196, thereby preventing any of the tubes other than tube A20 in the gas-tube matrix associated with selector 16 from striking when other calls are answered.

Ringback tone is superimposed on the −100 volt supply leading to relay 50. This tone is transmitted to the calling party over the following path: relay 50, contacts 55, contacts 33, tube A20, lead AN–1, coupling condenser in selector 16, lead CA–1, tube C10, transformer 28 and loop circuit of line 01. In case the called party fails to answer, tube A20 extinguishes when the calling party restores the handset, thereby releasing relay 50. If the called party answers, line relay 30 operates over the following path: ringing generator, contacts 53, substation 11, contacts 51, relay 30 and battery. The short circuit provided by contacts 51 to short out the primary of transformer 46 prevents the ringing voltage from appearing in the gas-tube matrix.

Relay 30 operates to transfer the cathodes of tubes A20, A21, A22 and A2$n$ from relay 50 to the line transformer 46. The previously established circuit through tube A20 prevents the cathodes of tubes C20, C21, C22 and C27 from falling below −30 volts, thereby preventing seizure of another selector. Relay 30 in operating grounds the L2 lead to mark line 02 as busy by closing contacts 34 and restores the relay 50 by breaking contacts 35.

Relay 50 restores and removes the short-circuit established by contacts 51 across the primary winding of transformer 46. A two-way communication channel is now established between lines 01 and 02 over the following path: transformer 28, tube C10, coupling condenser in selector 16, tube A20 and transformer 46.

If the called party restores the handset first, relay 30 restores to transfer the cathode of tube A20 to ground from the transformer 46. When the calling party replaces the handset, relay 20 restores to extinguish tubes C10 and A20. Selector 16 is released and changes the potential on its guard lead so that the selector 16 may be assigned to another call by the distributor 27. In case the called party does not replace the handset first, the called line circuit remains connected to the idle selector, when the calling party disconnects. The selector 16 is released when the called party replaces the handset.

It is to be understood that variations and modifications may be effected without departing from the scope of the appended claims.

What is claimed is:

1. In an electronic selector having means for receiving digital impulses, a first counting chain for storing and counting a first series of digital impulses and a second counting chain for storing and counting a second series of digital impulses, an electronic valve for repeating said received digital impulses and connected to said first counting chain for transmitting a first series of repeated digital impulses to said first counting chain to cause said first chain to store and count said first series of pulses, and means controlled by said valve after transmission of said first series of pulses for disconnecting said valve from said first chain and for connecting said valve to said second chain whereby repeated pulses from said valve are transmitted to said second counting chain for causing said second counting chain to store and count a second series of repeated digital impulses.

2. In an electronic selector, a pulsing circuit for transmitting a plurality of series of digital impulses, a first plurality of electron tubes, circuit means interconnecting said first tubes for providing sequential energization therefor, said first tube sequentially energized by said pulsing circuit for counting and storing a first series of transmitted digital impulses, a second plurality of electron tubes, other circuit means interconnecting said second plurality of tubes for providing sequential energization therefor, and a transfer circuit completed by said pulsing circuit after transmission of said first series of digital impulses for enabling said pulsing circuit to sequentially energize said second plurality of tubes to count and store a second series of transmitted digital pulses, both said plurality of tubes thereby counting and storing a respective series of digital impulses.

3. In a communication circuit, a pulsing circuit for transmitting a plurality of series of digital impulses, a first plurality of electron tubes, circuit means interconnecting said first tubes for providing a binary sequential energization therefor, said first tubes energized by said pulsing circuit in a binary sequential manner for counting and storing a first series of digital impulses transmitted by said pulsing circuit, a second plurality of electron tubes, other circuit means interconnecting said second plurality of tubes for providing binary sequential energization therefor, a transfer circuit completed by said pulsing circuit after transmission of a first series of digital impulses for preparing said second plurality of tubes, said second plurality of tubes energized in a binary sequential manner for storing and counting another series of digital impulses transmitted by said pulsing circuit, and a digit converting circuit connected to said first and second plurality of electron tubes for converting said stored digital impulses into a decimal equivalent.

4. In a communication circuit, a pulsing circuit for transmitting a plurality of series of digital impulses, a first plurality of gas tubes, circuit means interconnecting said gas tubes for providing a binary sequential energization therefor, said gas tubes energized in a binary sequential manner by said pulsing circuit for counting and storing a first series of transmitted digital impulses, a second plurality of gas tubes, other circuit means interconnecting said second plurality of gas tubes for providing a binary sequential energization therefor, a transfer circuit completed by said pulsing circuit after transmission of said first series of digital impulses for preparing said second plurality of gas tubes, said second plurality of gas tubes energized in a binary sequential manner by said pulsing circuit for counting and storing a second series of transmitted digital impulses, a digit converting circuit, and means associated with said pulsing circuit operated after all of said series of digital impulses have been stored and counted for connecting said digit converting circuit to both said plurality of gas tubes for converting the respective digital impulses stored in said binary sequence into a decimal equivalent.

5. For use in a communication circuit having a plurality of electronic counting chains associated therewith for the purpose of individually registering a respective series of digital impulses therein, and impulsing circuit including a cathode follower connected to said impulsing circuit and comprising a tube having a cathode resistor and means whereby a series of pulsations from said impulsing circuit are reproduced by said tube across said cathode resistor which correspond in number to a first series of digital impulses and transmitted to one of said counting chains for registering a digit corresponding to the number of impulses in said first series, a second tube, a unidirectional circuit connected between said cathode follower and said second tube for transmitting a potential of one polarity during said series of pulsations to said second tube for energizing said second tube, a circuit, means operated by said second energized tube for preparing said circuit from said cathode follower to another of said counting chains, means for deenergizing said second tube after a first series of pulses are transmitted to said one chain, and means operated by said deenergized second tube for completing said circuit from said cathode follower to said other counting chain to thereby permit a digit corresponding to the number of impulses in a second series of impulses produced across said cathode follower to be registered in said other chain.

6. An arrangement such as claimed in claim 5, in which said potential is transmitted intermittently during each series of pulses for energizing said second tube correspondingly, and means associated with said second tube and operated by each potential transmission and said energized second tube for maintaining said second tube energized between said intermittent transmissions of said potential and only until a series of impulses are transmitted to said one chain.

7. An arrangement such as claimed in claim 5, in which said potential is transmitted to said second tube for energizing said second tube during each series of pulses, a digit converting circuit, and means operated by said second tube after a predetermined number of energizations for associating said converting circuit with one of said chains for translating a digit registered therein.

References Cited in the file of this patent

UNITED STATES PATENTS

| | | |
|---|---|---|
| 822,888 | Fuller | June 5, 1906 |
| 2,342,886 | Murphy | Feb. 29, 1944 |

(Other references on following page)

UNITED STATES PATENTS

| | | |
|---|---|---|
| 2,407,320 | Miller | Sept. 10, 1946 |
| 2,539,014 | Frantz | Jan. 23, 1951 |
| 2,576,099 | Bray et al. | Nov. 27, 1951 |
| 2,603,716 | Low | July 15, 1952 |
| 2,607,891 | Townsend | Aug. 19, 1952 |
| 2,619,528 | Vroom | Nov. 25, 1952 |
| 2,700,146 | Bachelet | Jan. 18, 1955 |
| 2,717,994 | Dickinson | Sept. 13, 1955 |
| 2,724,789 | Overbeck | Nov. 22, 1955 |

FOREIGN PATENTS

| | | |
|---|---|---|
| 197,503 | Great Britain | May 17, 1923 |
| 312,706 | Great Britain | June 6, 1929 |
| 707,734 | Germany | July 2, 1941 |